United States Patent
Weber

[15] 3,647,289
[45] Mar. 7, 1972

[54] APPARATUS AND METHOD FOR HOLOGRAM COPYING WITH REFERENCE BEAM INTENSITY CONTROL

[72] Inventor: Bob L. Weber, Columbus, Ohio

[73] Assignee: Holotron Corporation, Wilmington, Del.

[22] Filed: Mar. 28, 1969

[21] Appl. No.: 811,384

[52] U.S. Cl. ................................................355/2, 350/3.5
[51] Int. Cl. .....................................................G03b 27/00
[58] Field of Search .......................................355/2; 350/3.5

OTHER PUBLICATIONS

Par Y. Belvaux, " Duplication Des Hologrammes," Apr. 1967.

C. B. Burckhardt, " Display of Holograms in White Light," Dec. 1966.

*Primary Examiner*—Samuel S. Matthews
*Assistant Examiner*—Robert P. Greiner
*Attorney*—Woodcock, Washburn, Kurtz & Mackiewicz

[57] ABSTRACT

A technique for making a copy of an off-axis hologram wherein the hologram and a photosensitive copy detector are placed very close together with a means therebetween, for significantly attenuating that portion of a reconstructing light beam which is undiffracted by the hologram without significantly altering the intensity of an image carrying first order diffracted beam.

18 Claims, 7 Drawing Figures

PATENTED MAR 7 1972 3,647,289

PATENTED MAR 7 1972 3,647,289

SHEET 2 OF 2 ered by Brumn in *Applied Optics*, Vol. 5, No. 12, Page 1,946 (December, 1966), and in his copending patent application Ser. No. 598,008, filed Nov. 30, 1966, the copy detector may be placed close to the original hologram, thereby obtaining a better reproduction of the original, without having to use elaborate vacuum equipment previously thought to be necessary to hold the hologram and copy detector together in making a contact print. The essential configuration reported by Brumn requires placing the copy detector in a position to intercept both the desired image carrying diffracted beam and the undiffracted beam which interfere to produce a copy hologram. The undiffracted beam serves as the reference beam for the copy hologram. Additionally, placing the copy detector very close to the hologram allows reconstruction of a wavefront from the copy which is nearly identical to that reconstructed from the original hologram, a desirable situation. Landry describes in *Applied Optics*, Vol. 6 No. 11, page 1,947 (November, 1967) this type of hologram copying in greater detail.
APPARATUS AND METHOD FOR HOLOGRAM COPYING WITH REFERENCE BEAM INTENSITY CONTROL

BACKGROUND OF THE INVENTION

This invention relates generally to the art of holography and more specifically to improved techniques of copying holograms.

The general principles of holography are described by Leith and Upatnieks in the *Scientific American*, June 1965, pages 25–35, and in their copending patent application Ser. No. 361,977, filed Apr. 23, 1964, now U.S. Pat. No. 3,506,327, issued Apr. 14, 1970. Briefly described, the art of off-axis holography involves the interference of two coherent radiation beams directed onto a holographic detector at some finite angle therebetween. One of the radiation beams is modified by an object scene to be recorded and the other beam strikes the detector unmodified. Optical holography is practiced with radiation within the visible or near visible regions of the electromagnetic radiation spectrum and the holographic detector is some photosensitive material, such as high-resolution photographic film. After the film is exposed to the interfering beams, it is generally developed in a normal photographic manner. The result is a hologram which usually appears to the observer to be substantially transparent but which contains recorded thereon in the developed photographic emulsion a large number of interference fringes which contain information of the object scene.

When such a hologram is illuminated with a radiation beam that is the same as or similar to the reference radiation beam used in its construction, the object modified wavefront striking the hologram detector during its construction is reconstructed in both amplitude and phase in a first order diffracted beam. In a normal transmission type of hologram, about 1 percent of the light intensity of the reconstruction beam is diffracted into the desired image carrying wavefront. Most of the remainder of the reconstructed beam intensity passes through the hologram in an undiffracted beam or is absorbed by the hologram. To observe a full three-dimensional image of the object scene recorded on the hologram, the image carrying diffracted beam is viewed.

It was originally thought that such a hologram could be duplicated by a contact printing technique similar to contact printing used in ordinary photography. However, it has been found to be extremely difficult to get the copy film emulsion close enough to the hologram before separation of the beams diffracted and undiffracted by the hologram diffraction pattern. The copy film does not receive a shadow of the interference fringes as desired because the illuminating light is scattered by diffraction so the resolution of the interference pattern as copied is poor. This results in a very noisy reconstructed image carrying wavefront. The difficulty with actual contact printing is discussed in more detail by Harris et al. in *Applied Optics*, Vol. 5 No. 4, page 665 (Apr. 1966), and by Landry, *Applied Physics Letters*, Vol. 9, No. 8, page 303 (Oct. 15, 1966).

Instead of trying to contact copy the interference fringe pattern of the hologram, a photosensitive copy hologram detector may be placed a distance from the hologram in the path of the image carrying diffracted beam which serves as the object modified beam for the copy hologram. A reference beam coherent with the image carrying diffracted beam is directed at a finite angle therewith to the copy hologram detector and a new hologram is constructed. This technique has certain disadvantages for some applications since the copy detector must be placed far enough away from the hologram in its image carrying diffracted beam so that no portion of the undiffracted beam strikes the copy detector. The field of view of the copy hologram is less than that of the original hologram and its image is in a different position relative to the copy hologram than the image of the original hologram is to that hologram. Furthermore, it is inconvenient in certain situations to use a separate reference beam for making the copy.

Many specific holograms desired to be copied diffract reconstructed light into two first order image-carrying beams which each generate their own interference pattern with the undiffracted portion of the reconstructing beam. The result is a copy of the hologram which generates an undesired second set of images. This problem is considered in more detail by Brumn in *Applied Optics*, Vol. 6, No. 3, page 588 (March, 1967), and by Sherman in *Applied Optics*, Vol. 6, No. 10, page 1,749 (October, 1967). Both of these writers point out that the undesirable double images may be eliminated by constructing the master hologram with large angles between the object modified and reference radiation beams and if the hologram is made from a photographic film with thick emulsion. However, another technique is desired for eliminating these double images in the copying process so that the master hologram need not be made especially for copying.

Also, the above-noted hologram copying techniques do not produce copies which are faithful reproductions of the original as can be observed by the high amount of noise associated with an image reconstructed from a copy hologram. Therefore, it is a primary object of this invention to provide an improved technique of hologram copying which results in reconstructed images from the copies of improved quality.

It is also an object of this invention to provide an improved technique for copying holograms wherein the reconstruction from a copy is limited to a single image or desired pair of images.

SUMMARY OF THE INVENTION

These and additional objects of the invention are realized by a technique wherein the intensity of the undiffracted and diffracted portions of an off-axis hologram reconstructing radiation beam, except for a desired first order image carrying diffracted beam, are significantly attenuated before striking a copy detector. By "off-axis" hologram, as used herein, is meant one which has been constructed with a finite angle between interfering reference and object modified radiation beams so that upon reconstruction the desired first order image carrying beam is angularly displaced from the undiffracted beam. In the preferred form of this invention, the hologram reconstruction radiation beam includes electromagnetic radiation within the visible, ultraviolet and infrared wavelength ranges (herein referred to as "light") and the copy detector is a photosensitive copy detector.

Hologram copies constructed according to the aforementioned known technique wherein a first order image carrying beam diffracted thereby interferes with a beam undiffracted thereby has been found to produce a copy hologram with a great deal of noise in its reconstruction which tends to obscure the desired object image. The reason for this appears to be a substantial intensity unbalance between the image carrying diffracted and undiffracted beams interfering at a photosensitive copy detector. The undiffracted beam may have an intensity approximately 100 times that of the first order image carrying diffracted beam and their interference at the photosensitive copy detector produces an interference pattern recorded thereon with a low depth of modulation relative to the intensity recorded. This unfavorable beam ratio can be improved without additional elements by constructing the hologram with a high optical density that absorbs most of the undiffracted light but the best beam intensity ratio realizable by this technique is about 10 to 1, where a beam intensity ratio of approximately 1 to 1 is required for best copies. The intensity unbalance is corrected according to this invention by substantially attenuating the undiffracted beam before interfering with the desired image carrying diffracted beam at the photosensitive copy detector. This attenuation is accomplished, according to a preferred form of the invention, by a filter placed between the hologram and the copy detector which attenuates light an amount dependent upon its angle of incidence.

According to one embodiment of the present invention, an optical filter is placed between the master hologram and the copy detector which is designed to attenuate the undiffracted beam significantly but allow the desired first order image carrying diffracted beam to pass from the hologram to the copy detector substantially unattenuated. Such a filter is a multifilm dielectric optical filter constructed for a particular wavelength of reconstructing light, its polarization, and the angular separation between the undiffracted and image carrying diffracted beams for a given hologram to be copied.

As an alternative to attenuation of the undiffracted beam for use as a reference in constructing a copy hologram, the undiffracted beam may be attenuated to the point of being substantially blocked and the necessary reference beam may then be directed against the copy detector independent of the reconstructing beam and thus its intensity independently controlled. According to a second embodiment of the invention, a plurality of thin opaque sheets comprising a mechanical filter are placed between the master hologram and the photosensitive copy detector with their broad surfaces oriented in a manner parallel with the first order image carrying diffracted beam to be recorded on the copy. The dimensions and spacing of the opaque sheets is determined by the angular displacement between the undiffracted and first order diffracted beams and designed to completely block the undiffracted beam.

According to a third embodiment of the present invention, material is placed between the master hologram and the copy detector which is angularly sensitive in a manner to partially or totally reflect the undiffracted beam and also to pass substantially unattenuated the image carrying diffracted beam which strikes the surface at a different angle. Such a material has a refractive index which is greater than that of the surrounding air and positioned for substantially total internal reflection of the undiffracted beam at a boundary therebetween. A separate, independently controlled reference beam is then directed at the copy detector for interference with the substantially unattenuated image carrying diffracted beam.

For a more detailed understanding of the invention and for further objects and advantages thereof, reference should be had to the following description taken in conjunction with the drawings.

DETAILED DESCRIPTION OF THE PREFERRED EMBODIMENTS

Figure 1:
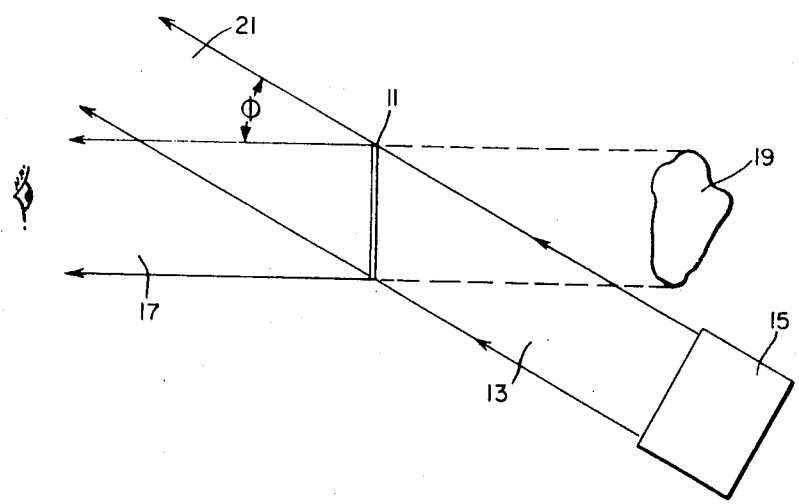
FIG. 1 schematically illustrates reconstruction of an image from a hologram.

Reconstruction of an image from a typical optical off-axis hologram is illustrated in FIG. 1. A hologram 11 is illuminated with a reconstructing coherent light beam 13 which is generated by a coherent light source 15. The coherent light source 15 preferably includes a laser of an appropriate wavelength with associated optics for generating a reconstructing beam having the desired degree of convergence or divergence. Throughout this description, collimated beams, such as the reconstructing beam 13, are illustrated for simplicity of explanation but it should be understood that the beams could also be diverging or converging. The general criterion is that the reconstructing beam 13 should have the same curvature in its wavefront and should strike the hologram 11 as did the reference radiation beam used in constructing the hologram 11 in order to obtain the best virtual image.

The recorded interference pattern of the hologram 11 diffracts the reconstructed beam 13 into at least one image carrying beam 17. An observer positioned so that the diffracted beam 17 strikes his eye will see a full three-dimensional image 19 of the object originally recorded on the hologram 11. The image 19 as shown in FIG. 1 is a virtual image since it appears to the observer to be located behind the hologram 11.

Since the usual hologram 11 is substantially transparent except for the recorded interference fringes which diffract a portion of the reconstructing light 13, the remainder of the light beam 13 passes through the hologram 11 in an undiffracted beam 21. For a typical pictorial hologram less than 1 percent of the intensity of the reconstructing light beam 13 is diffracted into the desired image carrying beam 17 with most of the remaining light intensity contained in the undiffracted beam 21. Therefore, it is not desired to view the undiffracted light beam 21. The angle $\phi$ of displacement between the diffracted and undiffracted light beams is determined by the geometry used in constructing the hologram 11 and is related to the angle of interference between the object modified and reference beams striking the hologram detector during its construction.

Figure 2:
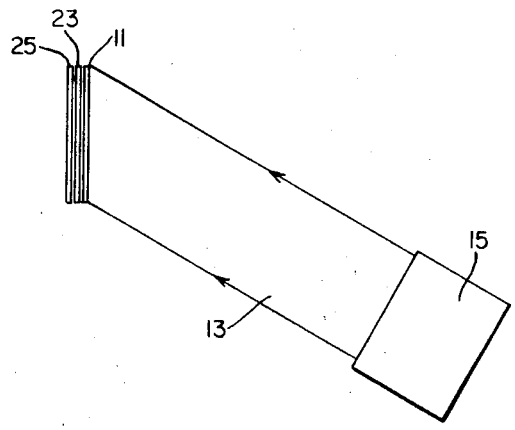
FIGS. 2 and 3 illustrate the invention according to one embodiment thereof wherein a multifilm dielectric optical filter is placed between the hologram and the copy detector.

In copying such an off-axis hologram, it is desirable to place a photosensitive copy detector in the diffracted beam 17 as close to the hologram 11 as possible in order to make the copy with a wavefront similar to that recorded on the hologram 11. Merely placing the copy detector along the left side of the hologram 11 in the configuration of FIG. 1 will indeed produce a copy by interfering the diffracted beam 17 with undiffracted beam 21 which is necessarily coherent therewith. However, the great intensity difference between the two beams will not produce a faithful reproduction of the hologram 11. It has been found that the quality of the copy hologram may be improved by inserting between it and the hologram 11 a filter which is angularly sensitive in a manner to attenuate the undiffracted beam 21 without affecting the image carrying diffracted beam 17. Referring to FIG. 2, such a configuration is shown according to one embodiment of the present invention wherein an optical filter 23 is placed between the hologram 11 and a photosensitive copy detector 25. The optical filter 23 is chosen to have characteristics which substantially attenuates the undiffracted beam 21 to bring it down in intensity for interference with the image carrying beam 17 and thereby produce a better hologram copy. It is usually preferable that the intensities of the two interfering beams at the copy detector 25 be approximately equal when the copy detector includes photographic film. This preferred photographic film intensity ratio is considerably different than the ratio of undiffracted to diffracted beam intensity which exists without the use of the optical filter 23.

Figure 3:
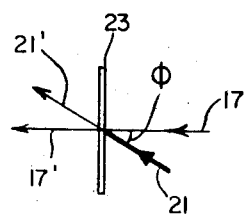

Referring to FIG. 3, the preferred characteristics of the optical filter 23 may be illustrated. A suitable optical filter 23 is one which attenuates light radiation an amount dependent upon its angle of incidence against the filter since the diffracted and undiffracted beams 17 and 21, respectively, are at some finite angle φ with each other. There are many known materials and filters which have angularly dependent transmission characteristics and a preferred filter is characterized by at least one angle of incidence thereon in which the transmission is nearly 100 percent. Such a filter is utilized according to this invention with the image carrying diffracted beam striking the optical filter at the angle for near maximum transmission.

A preferred filter with these characteristics is a multifilm dielectric optical filter which attenuates radiation incident thereon depending upon its wavelength, polarization, and angle of incidence. The underlying principles for construction of a filter for any specific application are set forth by Born and Wolf, *Principles of Optics*, third (revised) edition, Pergamon Press, in Chapter I beginning on page 51. Such filters are also commercially available, such as the Bausch and Lomb dichroic filter number 45-1-580 used with laser light of 6,328 angstroms.

The hologram 11, optical filter 23 and copy detector 25 are preferably placed in close contact with mineral oil at the surface interfaces to improve the impedance matching and thereby reduce reflections.

It should also be noted that a color hologram may be copied by application of the techniques of this invention. There are several known techniques of color holography which involve recording a separate interference pattern for each of a plurality of distinct wavelengths. A copy may be made by successive exposures of the distinct wavelengths used in constructing the hologram to be copied, each exposure generally requiring a separate optical filter which has desired attenuation characteristics for each specific wavelength.

Instead of using the undiffracted beam as a reference beam in constructing a copy hologram, it may be desirable in certain circumstances to completely block the undiffracted beam 21 and illuminate the copy detector by an independently controlled source of illumination. Use of a separate copy detector reference beam is generally inconvenient but there are circumstances in which this inconvenience is outweighed by the advantage of being able to finely control the reference beam intensity. Also, a separate reference beam is needed if the copy detector is to be illuminated by reference light at its side opposite to the side illuminated by the image carrying diffracted beam according to known back beam holographic techniques. A multifilm dielectric optical filter may be employed to block this beam, if desired.

Figure 4:
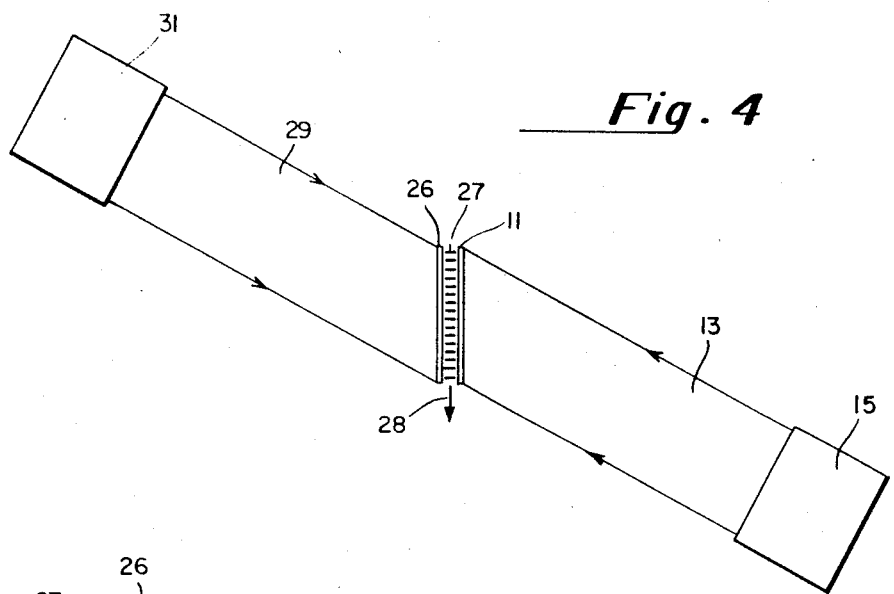
FIGS. 4 and 5 schematically illustrate two specific ways for carrying out this invention according to a second embodiment thereof wherein a mechanical filter comprising a plurality of thin opaque sheets is placed between the hologram and the copy detector.

Other techniques may also be employed for completely blocking the undiffracted beam. Referring to FIG. 4, a mechanical filter 27 is inserted between the hologram 11 and the copy detector 26. The mechanical filter 27 consists of a plurality of thin opaque sheets with their broad surfaces oriented parallel with rays of the image-carrying diffracted beam 17 but spaced sufficiently close together in order to block the undiffracted beam 21 which passes through the filter at a different angle. The operation of the filter is something like that of a venetian blind which is disclosed generally for use in holography in copending application Ser. No. 503,993, filed Oct. 23, 1965. A reference beam 29 is directed against the copy detector 26 to interfere with the image carrying diffracted beam 17. Such geometry will produce a back beam hologram from which an image may be reconstructed by reflecting reconstructing light therefrom. The reference beam 29 should be coherent with the reconstructing beam 13 and may be generated by a separate coherent source 31 or, more conveniently, may be derived from the same source that generates the reconstructing beam 13 by use of standard optical elements.

Figure 5:
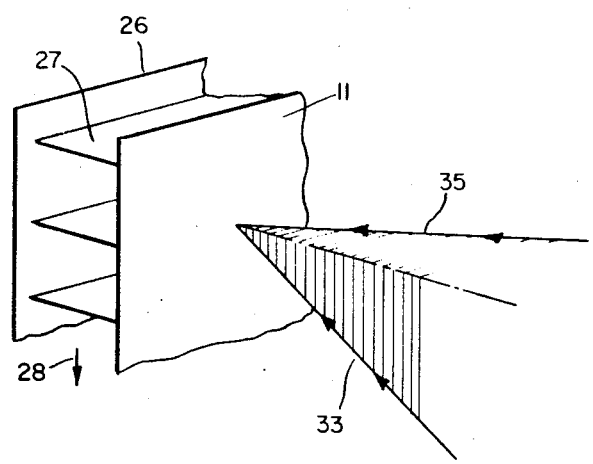

In situations where a back illuminated copy hologram is not desired, the copy detector 26 may be illuminated both by a reference beam and the diffracted image carrying beam 17 from its same side as schematically illustrated in FIG. 5. Reconstructing illumination 33 is directed at an angle with the opaque sheets of the mechanical filter 27 to be blocked, thereby not reaching the copy detector 26. A separate reference beam 35 is directed through the hologram 11 toward the copy detector 26 for interference with the image carrying beam diffracted by the hologram 11. The reference beam 35 should be directed in a manner so that the mechanical filter 27 will present a minimum attenuation thereto. It may be desirable to move the filter 28 during exposure in a plane parallel to the planes of the hologram and copy detector in a direction shown by arrow 28, so that an image of the filter does not appear in the copy.

Another technique for totally blocking the undiffracted light is to place between the hologram and the copy detector a surface of material having a high refractive index relative to that of air which will totally reflect the undiffracted light beam if it strikes the surface beyond the critical angle of the material but will pass the image carrying diffracted light beam if it strikes the material below its critical angle. The principles of total internal reflection and critical angle are summarized by Jenkins and White, *Fundamentals of Optics*, Third Edition, McGraw-Hill Book Co., in Chapter II, especially pages 15 through 17.

Figure 6:
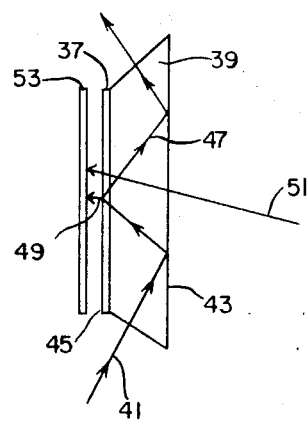
FIGS. 6 and 7 schematically illustrate the present invention according to a third embodiment thereof wherein a reflective surface is placed between the hologram and the copy detector.

The use of total internal reflection is illustrated in FIG. 6 in the form of a third embodiment of the present invention. The hologram 37 to be copied is preferably a glass base with a photosensitive emulsion coating on one side thereof, the emulsion side being attached to a truncated prism 39 with the use of mineral oil or some other substance to prevent reflections at the boundary. A reconstruction light beam 41 is directed into the prism for total reflection at its surface 43 onto the hologram 37. That portion of the reconstructing light beam that is undiffracted by the photosensitive emulsion is totally reflected from the internal surface 45 of the hologram supporting glass plate, in the form of a beam 47 which is directed out of the prism. The image-carrying diffracted beam 49 is not reflected since it strikes the internal surface 45 of the glass plate at an angle which allows transmission instead of reflection. An independent reference beam 51 is then directed through the prism and hologram onto the copy detector 53 for interference with the image carrying diffracted beam 49, thereby producing a copy hologram. The prism 39 is utilized to avoid reflection of the reconstruction light beam 41 from the initial outside surface of the hologram 37.

Figure 7:
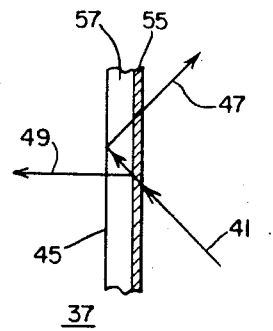

Referring to FIG. 7, the reflection phenomenon as utilized in FIG. 6 may be better understood. The reconstructing light beam 41 initially strikes the photosensitive emulsion 55 of the hologram 37 in which the interference fringes containing information of the object are recorded. These fringes diffract the light into an image carrying diffracted beam 49 which passes out of the hologram 37. The undiffracted portion 47 of the reconstructing light is totally reflected in an opposite direction than the direction of travel of the image-carrying diffracted beam 49. The reconstructing light beam 41 must make an angle with the surface 45 of the glass base 57 of the hologram 37 which forms an angle with a perpendicular to the surface which is greater than the material's critical angle and thus to cause total reflection of the undiffracted light. However, the diffracted light is caused to strike the surface 45 at an angle less than the critical angle of the material and thus is not reflected but passes directly out of the hologram.

It should be noted that the second and third embodiments of this invention described herein may also be adapted for copying without a separate reference beam. Both the optical filter and the total reflection filter may be used to transmit a portion of the intensity of the undiffracted beam for use as the reference beam at the copy detector. Accordingly, the mechanical filter 27 of FIGS. 4 and 5 may be constructed of color filter material with desired transmission characteristics instead of the opaque sheets described above. In the third embodiment described with respect to FIGS. 6 and 7, total internal reflection at the surface 45 of the glass base 57 will probably not set in suddenly at the critical angle but will be approached gradually as a function of angle of incidence of light at the surface 45. Therefore, the angle that the reconstructing light beam makes with the surface 45 may be chosen to attenuate the undiffracted beam an amount necessary for good intensity balance with the undiffracted beam 49 at the copy detector 53.

Although specific examples of the preferred embodiment of applicant's invention have been described hereinabove including specific angular relationships between optical elements and light beams, this description should not be taken as limiting the scope of the invention but is intended to illustrate working embodiments of the invention. Other specific arrangements and various changes and modifications of those arrangements shown herein may be made within the scope of the appended claims.

What is claimed is:

1. In a method of making a copy of an off-axis hologram, including the steps of:
   directing a coherent light beam to the hologram in a manner to produce at least one image carrying beam angularly displaced from an undiffracted beam, and
   locating a photosensitive copy detector in a position relative to the hologram to intercept both said at least one image carrying beam and said undiffracted beam in interference with each other, thereby constructing a copy hologram;
   the improvement comprising the step of:
   attenuating said undiffracted beam to a significantly greater extent than said at least one image carrying beam before striking the photosensitive copy detector and thereby to provide an undiffracted beam intensity level relative to the intensity of said at least one image carrying beam at the photosensitive detector to form an interference pattern with a depth of modulation appropriate for the photosensitive copy detector.

2. The improved method according to claim 1 wherein the step of attenuating said undiffracted beam includes placing a filter between the hologram and the copy detector which attenuates said undiffracted beam while allowing said at least one image carrying beam to pass substantially unattenuated.

3. The improved method according to claim 1 wherein the step of attenuating said undiffracted beam includes the step of locating a filter between the hologram and copy detector, said filter characterized by attenuation of light an amount dependent upon its angle of incidence thereon.

4. The improved method according to claim 1 wherein the step of attenuating said undiffracted beam includes placing a multifilm dielectric optical filter between the hologram and the copy detector.

5. The improved method of making a hologram copy according to claim 1 wherein the step of attenuating said unidiffracted beam includes the step of partially reflecting said undiffracted beam without significantly attenuating said at least one image carrying beam.

6. The improved method of claim 1 wherein the step of attenuating includes attenuating said undiffracted beam to an intensity substantially equal to the intensity of said image carrying beam at the copy detector.

7. In a method of making a copy of an off-axis hologram, including the steps of:
   directing a coherent light beam to the hologram in a manner to produce at least one image carrying beam angularly displaced from an undiffracted beam, and
   locating a photosensitive copy detector in a position relative to the hologram to ordinarily intercept both said at least one image carrying beam and said undiffracted beam in interference with each other;
   the improvement comprising the combined steps of:
   substantially blocking said undiffracted beam after leaving the off-axis hologram; and
   directing an independent reference beam coherent with said coherent light beam onto said hologram detector for interference with said at least one image carrying beam.

8. The image carrying method according to claim 7 wherein the step of substantially blocking said undiffracted beam includes placing a filter between the hologram and the copy detector which attenuates said undiffracted beam while allowing said at least one image-carrying beam to pass substantially unattenuated.

9. The improved method according to claim 7 wherein the step of substantially blocking said undiffracted beam includes placing a multifilm dielectric optical filter between the hologram and the copy detector.

10. The improved method of making a hologram copy according to claim 7 wherein the step of substantially blocking said undiffracted beam includes the step of reflecting said undiffracted beam without significantly attenuating said at least one image carrying beam.

11. The improved method of making a hologram copy according to claim 7 wherein the step of substantially blocking said beam includes the step of placing a plurality of thin opaque sheets between the hologram and copy detector in a manner to present only their thickness in the path of said at least one image carrying beam.

12. The improved method of making a hologram copy according to claim 11 which includes the additional step of moving said sheets parallel to the copy detector during its exposure.

13. Apparatus for making a copy of an off-axis hologram, which includes,
    means for directing a coherent light beam to the hologram in a manner to produce at least one image carrying beam angularly displaced from an undiffracted beam,
    a photosensitive copy detector located in a position relative to the hologram to ordinarily intercept both said at least one image carrying beam and said undiffracted beam in interference with each other;
    the improvement comprising,
    a multifilm dielectric optical filter located between the hologram and the photosensitive copy detector.

14. Apparatus according to claim 13 wherein said multifilm dielectric optical filter significantly attenuates said undiffracted beam while allowing said at least one image carrying beam to pass substantially unattenuated.

15. Apparatus according to claim 13 wherein said multifilm dielectric optical filter substantially blocks said undiffracted beam while allowing said at least one image carrying beam to pass substantially unattenuated.

16. Apparatus according to claim 13 wherein said photosensitive copy detector includes photographic film and wherein said optical filter is characterized by significant attenuation of said undiffracted beam so that the intensity of said undiffracted beam is substantially equal to the intensity of said undiffracted beam at said photographic film.

17. Apparatus for making a copy of an off-axis hologram, which includes,
    means for directing a coherent light beam to the hologram in a manner to produce at least one image carrying beam angularly displaced from an undiffracted beam,
    a photosensitive copy detector located in a position relative to the hologram to ordinarily intercept both said at least one image carrying beam and said undiffracted beam in interference with each other;
    the improvement comprising,
    substantially optically clear material with a refractive index greater than that of air and having an interface thereof with air positioned between said hologram and said photosensitive copy detector in a manner to internally reflect at least a portion of the intensity of said undiffracted beam upon passing out of said material into air without reflecting a significant portion of said at least one image carrying beam.

18. Apparatus for making a copy of an off-axis hologram, which includes,
    means for directing a coherent light beam to the hologram in a manner to produce at least one image carrying beam angularly displaced from an undiffracted beam, a photosensitive copy detector located in a position relative to the hologram to intercept both said at least one image carrying beam and said undiffracted beam in interference with each other;

an optical filter characterized by a degree of light transmission dependent upon the light's angle of incidence upon said filter and placed between the hologram and the copy detector, said filter substantially attenuating said undiffracted beam for interference with said at least one image carrying beam at said photosensitive copy detector.

* * * * *